Aug. 14, 1928.

W. H. FITTS 1,681,109

PRESSURE OPERATED INSTRUMENT

Filed March 16, 1922

Inventor:
Walter H. Fitts.
by Emery, Booth, Janney & Varney
Attys.

Patented Aug. 14, 1928.

1,681,109

UNITED STATES PATENT OFFICE.

WALTER HENRY FITTS, OF FOXBORO, MASSACHUSETTS, ASSIGNOR TO THE FOXBORO COMPANY, OF FOXBORO, MASSACHUSETTS, A CORPORATION OF MASSACHUSETTS.

PRESSURE-OPERATED INSTRUMENT.

Application filed March 16, 1922. Serial No. 544,264.

This invention relates to measuring instruments operated by pressure, such, for example, as pressure gages and metallic thermometers, and the object is to provide an instrument of this character the sensitiveness and accurateness of which will remain unimpaired even if subjected from time to time to abnormal conditions. My invention will be clearly understood by reference to the following description of certain illustrative embodiments thereof shown by way of example in the accompanying drawings, wherein.

Figure 1:
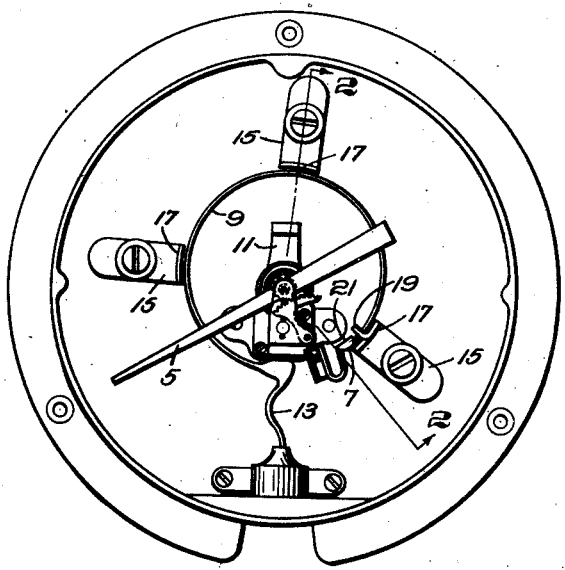
Fig. 1 is a front elevation of a pressure operated instrument with the dial removed to show the interior structure.

Referring to Fig. 1 of the drawings, I there show an indicating instrument having a hand or pointer 5 adapted to be actuated from the free end 7 of a Bourdon tube 9 mounted on a bracket 11 carried by the casing of the instrument. The Bourdon tube consists of a hollow curved spring tube to which the pressure which is to be measured may be admitted adjacent the fixed end thereof by means of the small gage pipe 13. The tube expanding or distorting under the influence of the pressure operates the pointer 5 in well known manner.

The strength and the range of movement of the Bourdon tube are determined by the work for which it is intended and its sensitive and accurate operation covers a certain determined range of pressure or temperature. An instrument designed for a certain limited pressure range may, however, from time to time be subjected to a pressure far exceeding the normal maximum. For instance, thermometers designed for use in milk Pasteurizing establishments have a normal temperature range of comparatively restricted amount. At times, however, the Pasteurizing tanks may be emptied and the thermometers may be subjected for a time to a temperature greatly in excess of this range. Under these circumstances the pressure sensitive device might be so strained as to acquire a permanent set or otherwise strained so that its accuracy and sensitiveness in its normal range would be impaired.

My invention provides a means for preventing any straining of the tube when it is subjected to abnormal conditions for which it is not designed. For this purpose I provide for positive stop means engaging the tube soon after it passes the position due to the normal maximum pressure and immobilizing it in such manner that any further increase in pressure causes absolutely no distortion thereof.

Figure 2:
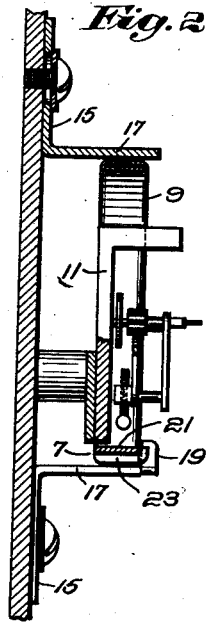
Fig. 2 is a section on the line 2—2 of Fig. 1 on an enlarged scale with the hand removed.

The stop means for engaging the tube may be formed as a part of the enclosing casing for the tube or suitably attached thereto as, for example, in Figs. 1 and 2 wherein I have shown a series of angle irons having (see Fig. 2) slotted arms 15 by which they may be adjustably secured to the back of the instrument casing and arms 17 extending over the tube 9 and preferably curved as shown to conform to the contour thereof. The provision of the slots in the arms 15 of these angle irons permits them to be adjusted to properly center them with respect to the tube 9. I herein show three of such stop devices which, while not literally engaging the entire outer surface of the tube 19, are in fact positioned in opposition to the outer surface of the tube substantially throughout its length. There being at least three of these devices, they provide a three point support for the tube which is circular. The distorting tendency of internal pressure is, of course, to increase the diameter of the circle and consequently, since three points determine a circle, the three point support provides for complete immobilization of the tube. The relatively short arcs between adjacent stop devices effectually resist pressure. It will be understood, however, that in a given instance the stop means are arranged in such number or of such extent that they engage a sufficient extent of the outer surface of the tube to be effective to hold it absolutely against further distortion and consequently prevent over-straining of the same. In the example of the invention shown an auxiliary stop is preferably provided acting on the free end 7 thereof as the tube seats on the arms 17 and for this purpose one of the stop elements is preferably arranged near the end 7 and a portion 19 of the arm 17 may be bent radially inwardly (the word "radially" being used in a general and not an exact geometrical sense) to overlie the tube 9. To the free end of the tube there is secured across bar 21 forming a projecting lug adapted to engage and seat on the tongue 19. When the instrument has been subjected to the maximum pressure for which it is designed, the tube is held at both ends of the arc, both where attached to the bracket 11 and at the free end 7, and is also given a three point support by the exteriorly arranged stops 17. A further advantage of the construction just described arises from the fact that the tube 9 is usually sealed at the free end and there is consequently usually present a large drop 23 of solder or like material projecting outwardly beyond the normal external contour of the Bourdon tube. The arrangement of the cooperating stop surfaces 21 and 19 permits the tube to be supported at the extreme free end while the arm 17 may be cut away where it would otherwise normally oppose this projection 23 permitting free movement of the Bourdon tube until the normal exterior surface thereof seats on that portion of the arm 17 immediately to the right of the tongue 19 viewing Fig. 1.

Figure 3:
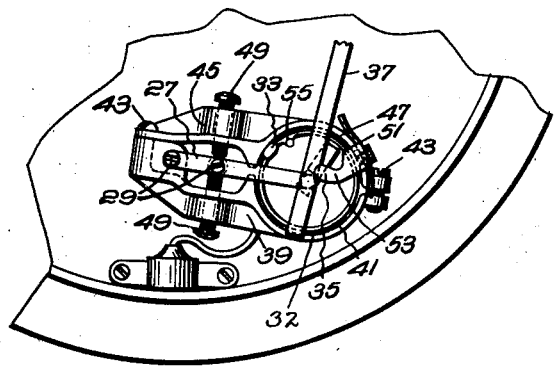
Fig. 3 is a fragment of the casing of an instrument of another type showing the pressure sensitive mechanism.
Figure 4:
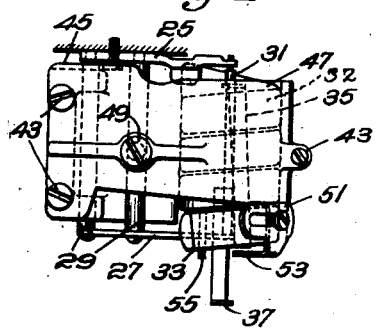
Fig. 4 is a plan of such mechanism.

In Figs. 3 and 4 I have shown a different form of pressure sensitive device consisting of a tube coiled into helical form. Referring to Fig. 4, I there show a plate 25 adapted to be secured to the back wall of an instrument case and an opposed plate 27 spaced therefrom by the pillars 29. Journalled in the two plates 25 and 27 is a shaft 31 around which is organized the helical tube 32 having a free end 33 which may be connected by a link 35 to the shaft 31 which is thus adapted to turn the same and actuate the hand 37. The positive stop means to prevent over-straining of the helical tube 32 in the example of the invention shown takes the form of a complete cylindrical housing or hood enclosing substantially the entire surface of the tube and determinately spaced therefrom in accordance with the purpose desired. I have herein shown a plate 39 pivoted on one of the pillars 29 and having the segmental cylindrical portion 41 opposing the tube. Clamped to opposite ends of this plate by the screws 43 is a cooperating plate 45 having a corresponding segmental cylindrical portion 47 mating with the portion 41 to form a substantially complete housing for the pressure sensitive tube. To center this housing with respect to the tube the plates may be provided with set screws 49 adapted to engage another of the pillars 29 as shown in Fig. 3. Preferably a portion of one of the plates is cut away as shown in Fig. 4 adjacent the free end of the tube, thus providing a clearance for the blob of solder sealing the same and clearly illustrated in the drawings. I may provide auxiliary stop means for supporting the free end of the helical tube corresponding to the devices 19 and 21 in the modification shown in Figs. 1 and 2. For this purpose a plate 51 may by means of the slot connection shown be adjustably mounted on the outer surface of the member 45 adjacent the free end of the tube and has projecting inwardly therefrom a hook 53. A cross bar or lug 55 may be mounted adjacent the free end of the tube and is adapted to enter the mouth of the hook 53 and seat in the throat of the same, thus providing a stop support for the free end of the pressure sensitive tube. At the same time the remaining spires of the tube expand into firm contact with the interior of surfaces 41 and 47 which provide three point support therefor.

I have described in detail the particular embodiments of my invention shown in the accompanying drawings, using specific descriptive words in doing so in order that they might be readily understood and not attempting in the course of this description to indicate in a more generic way what was exemplified by the specific structures shown and described. The specific disclosure and language used in describing it are not, therefore, to be taken in a limiting sense and the more general principles exemplified by my invention which I claim as new and desire to secure by Letters Patent I shall express broadly in the following claims.

I claim—

1. In an instrument of the class described in combination with a curved hollow tube distortable under internal pressure and having a fixed portion and a free end, positive stop means opposing the surface of the tube between said fixed portion and the free end and providing at least a three point support therefor, a fixed element extended radially inward adjacent the free end of the tube and a projecting lug on the tube adjacent said free end to seat on said element.

2. In an instrument of the class described, in combination, a pressure responsive device comprising a helical tube, means to admit pressure thereto and a segmental cylindrical housing embracing the tube and determinately spaced therefrom to provide a positive stop on predetermined expansion of the tube.

3. In an instrument of the class described, in combination, a pressure responsive device comprising a helical tube having a fixed portion and a free end, means to admit pressure to the tube, a segmental cylindrical housing embracing the tube and determinately spaced therefrom to provide a positive stop on predetermined expansion of the tube and cooperating auxiliary stops adjacent the free end of the tube and on said housing to limit circumferential movement of the free end.

4. The construction as defined in claim 3 wherein the one auxiliary stop is adjustably supported on the housing.

5. In an instrument of the class described, in combination, a pressure responsive device comprising a helical tube having a fixed portion and a free end, means to admit pressure to the tube, a segmental cylindrical housing embracing the tube and determinately spaced therefrom to provide a positive stop on predetermined expansion of the tube, a hook projecting inwardly from the housing and a lug secured to the tube adjacent the free end thereof adapted to enter the hook.

6. In an instrument of the class described, in combination, a pressure responsive device comprising a helical tube having a fixed portion and a sealed free end, means to admit pressure to the tube, a segmental cylindrical housing embracing the tube and determinately spaced therefrom to provide a positive stop on predetermined expansion of the tube, said housing being cut away adjacent the free end of the tube and a supplementary stop carried by the housing cooperating with the free end of the tube.

7. In an instrument of the class described, in combination, a pair of plates, pillars spacing the same, a shaft journalled in the plates, a helical pressure responsive tube surrounding the shaft and connected thereto to move the same, a pair of members clamped together in pivotal relation to a pillar, said members having cooperating portions forming a cylindrical housing enclosing the tube and set screws in said members for centering the housing about the tube.

In testimony whereof, I have signed my name to this specification.

WALTER HENRY FITTS.